UNITED STATES PATENT OFFICE.

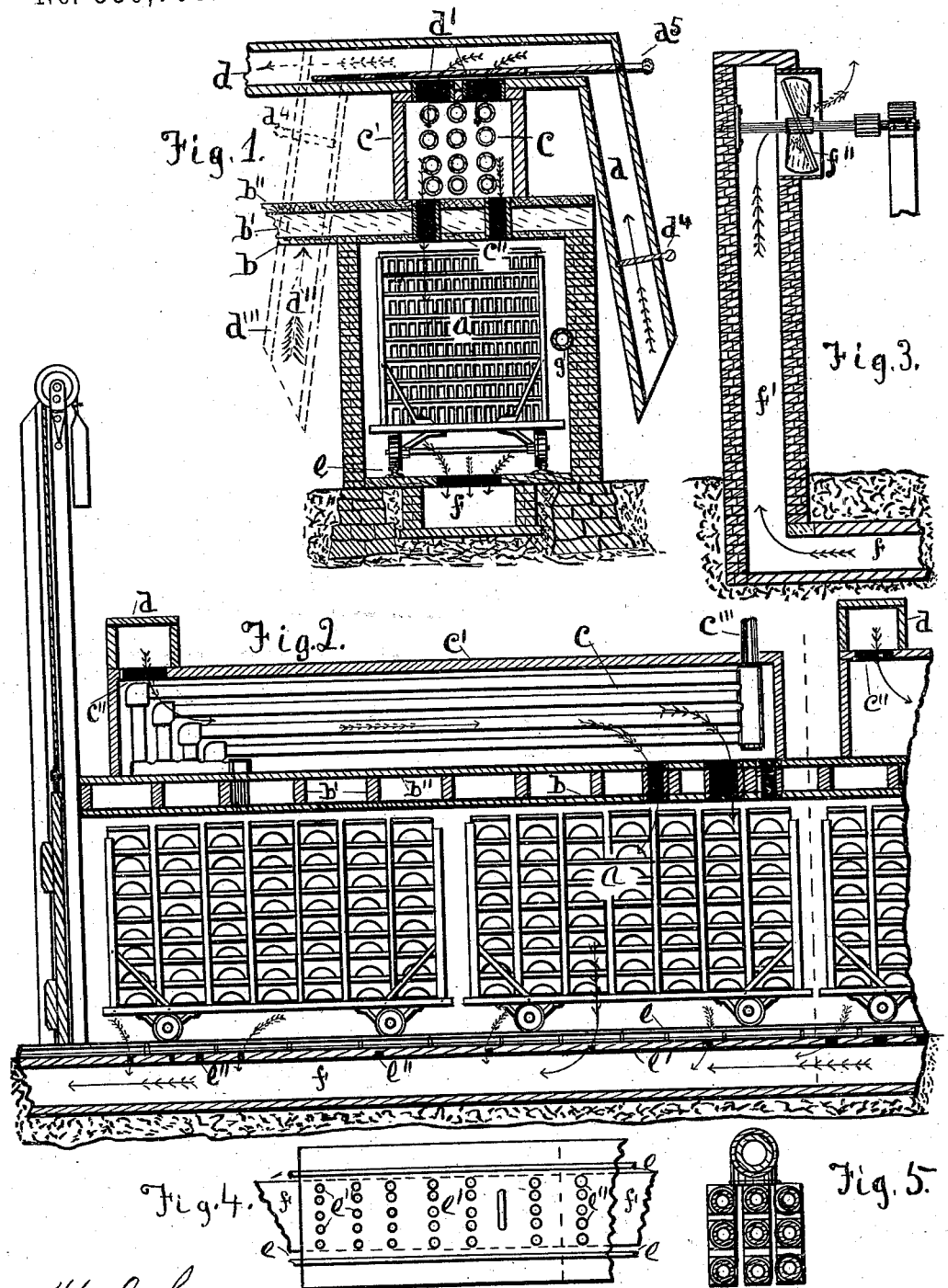

THOMAS BLAKE CAMPBELL, OF ITHACA, NEW YORK.

KILN FOR DRYING BRICK.

SPECIFICATION forming part of Letters Patent No. 550,708, dated December 3, 1895.

Application filed October 17, 1892. Serial No. 449,123. (No model.)

*To all whom it may concern:*

Be it known that I, THOMAS BLAKE CAMPBELL, a citizen of the United States of America, and a resident of Ithaca, Tompkins county, New York, have invented an Improved Drying-Kiln, of which the following is a specification.

My invention relates to drying-kilns which have a downward draft of heated air through them; and one of the main features of my kiln is a series of tightly-inclosed boxed structures about steam-pipe coils, each thus made section of the series being independent of the others and placed in line lengthwise of the kiln, making a longitudinal series of them on the top of the kiln. These and aiding adjuncts to them and to my kiln will be apparent as I describe my invention.

Figure 1 is a transverse sectional elevation of my drying-kiln with its heating attachments. Fig. 2 is a side sectional elevation of the entrance end of my kiln. Fig. 3 is a sectional elevation of the exhaust chimney-flue and exhaust-fan. Fig. 4 is a ground plan of the apertures in the kiln-floor, and Fig. 5 is a view of the steam-pipes for the boxed coils.

In the figures, $a$ is the kiln-tunnel, made quite long—as, for example, one hundred feet—with cars in it loaded with bricks to be dried, which are on the pallets or the stools, as they come from my improved brick-cutting machine, separated from each other to dry readily, and $b$ is the top of my tunnel, made of joists placed transversely on brick side walls, which joists are lathed and plastered on their under sides and floored with boards on their tops, and $c$ is one of a series of "multiform" coils of pipe into which steam is lead by any convenient arrangement of pipes. The exact forms and arrangements of the steam-supply pipes are of little consequence, provided they are effective. These coils are boxed tightly in by the casing $c'$ and air admitted to the inside of the casing by square wooden tubes $d$. These tube are made with their ends reaching downward to near the ground and extending upward to the top of the boxing of the coils of pipe (where there is a slide-valve with a handle) and are there continued horizontally across the top of the boxing, having one or more apertures $d$, which admit air into one of the ends of the coil-chambers, whence, as indicated by arrows, the air goes through the coils, is heated, and is drawn downward through a series of apertures made transversely through the ceiling of the tunnel to the bricks on the cars in the tunnel, the air circulating among the bricks and drying them, passing from above downward and in a direction from the right hand of the cars, as seen in Fig. 2, to the left and to the apertures $e''$ in the floor of the tunnel, which apertures admit the air to the flue $f$, which flue connects with the draft-chimney $f'$, at the the top of which is the exhaust-fan $f''$.

I use several tunnels side by side; but each tunnel is a complete structure by itself with no connection to any other, the only changes being the duplicating the air-tube $d$ in length and the connection of the supply steam-pipes and the water-pipes of the condensed steam, and these pipe connections are well-understood arts that need no illustration or description.

In Fig. 1 the mode of the extension of the air-tube $d$ is shown, and the descending air-tube $d''$ is shown in dotted lines to indicate its place and shape, whether the air-tube supplies one or several tunnels. A portion of a second tunnel at the left is shown, and is a repetition of the tunnel illustrated and described.

The steam-pipe coil shown in Fig. 2 is the one next to the left-hand end of the tunnel, where are the suspended entrance-doors, and at the left hand of Fig. 2 enough of the next section-coil and its air-tube and boxing is shown to indicate a second section, and these sections are repeated one after the other longitudinally the whole length of the tunnel, be its length what it may, each section of coils and boxings and air-tubes being independent of the others and steam being admitted to any one or every one of the separate coils by valves. The rail-cars and sections are made, preferably, to suit each other, two cars to each section. Corresponding suspended or other doors at the other end open to allow the cars to be drawn or pushed out when, at the entrance, cars enter the tunnel. The draft-flue $f$ runs beneath the whole length of the tunnel, and its exit is preferably at the entrance end of the tunnel, and between it and the inside of the tunnel are made, preferably, round apertures (but which may be slots) transverse to the tunnel, the said holes being small, as one-inch at the entrance end and three-inch holes at the exit end of the tunnel and graduated by increasing sizes and numbers from its entrance end to the exit end or smaller near the draft-chimney and fan than at the remote end of the tunnel, thus making its draft more perfect. The water of the steam condensation is conducted from each section to the common pipe $g$, by which it goes into a tank near the steam-engine of the brick works. Arrows indicate the directions of air circulation and slide-valves $d'$ control it. The downward ends of the air-tube $d$ are made to obviate as well as to use the force of winds. A dotted line between the second and third ends of the cars, Fig. 2, from the left-hand end of the tunnel indicates the relation of the sections of one, two, or more cars.

As to mechanical details not mentioned above, $b'$ indicates the joists of the tunnel ceiling; $b''$, the floor resting on these joists; $d'''$, the interrupted lines that show the left-hand portion of the air-entrance flue.

$d^4$ is a slide-valve in the right-hand portion of the air-entrance flue; $d^5$, the slide-valve by which the air-entrances of the coil-chambers are opened and closed.

$e$ indicates the rails of the cars; $e'$, the roofing of the flue $f$; $c''$, the air-entrance through the ceiling of the tunnel, and $c'''$ one of the general steampipes of the steam-coils.

Everything else is believed to be apparent.

I claim—

1. In the described drying kiln, the steam coil chambers, or sections, constructed longitudinally on the top of the kiln-tunnel, provided with air apertures in their tops at one of their ends; and their floors with apertures at their other ends; the apertures in their tops admitting the air to be heated, and those in their floors passing the heated air out of the sections, through the ceiling of the kiln down into the tunnel, as shown and set forth.

2. As a constituent part of the described drying kiln, the device for air admission to the tunnel; consisting of a series of air admission tubes, constructed transversely across and over the outside of the kiln; in combination with a series of steam coil pipe chambers situated on the top of the kiln; each end of each tube being a mouth, situated and opening near the ground, close to the opposite sides of the kiln; whence each tube extends up the sides of the kiln, to and over its top, and to a steam pipe coil chamber; where through an air entrance aperture, it communicates to the inside of the coil chamber; the chamber having an air aperture communication with the inside of the tunnel beneath it; substantially as set forth.

3. As a constituent part of the described drying kiln, the device for the circulation of heated air through the tunnel, and its exit out of the kiln; consisting of an exhaust flue constructed and situated underneath a rail car track, which traverses longitudinally the tunnel; the top of the flue being a part of the tunnel floor, laid between the rails of the track, and furnished with apertures, which increase in size from the entrance end of the tunnel to its exit end; in combination with a series of steam pipe coil chambers, situated on the top of the kiln; which, through apertures in the floor of the chambers, and in the ceiling of the tunnel, furnish heated air to the tunnel; whereby the bricks on the rail cars are dried substantially as set forth.

THOMAS BLAKE CAMPBELL.

Witnesses:
S. J. PARKER,
M. BRADLEY.